United States Patent
Miao et al.

(10) Patent No.: US 12,306,745 B2
(45) Date of Patent: May 20, 2025

(54) METHOD FOR ASSESSING TEST ADEQUACY OF NEURAL NETWORK BASED ON ELEMENT DECOMPOSITION

(71) Applicant: BEIJING AEROSPACE INSTITUTE FOR METROLOGY AND MEASUREMENT TECHNOLOGY, Beijing (CN)

(72) Inventors: Yinxiao Miao, Beijing (CN); Yifei Liu, Beijing (CN); Ping Yang, Beijing (CN); Xiujian Zhang, Beijing (CN); Zhonghao Cheng, Beijing (CN); Long Zhang, Beijing (CN); Tianqi Wan, Beijing (CN); Haoyi Chen, Beijing (CN); Jing Sun, Beijing (CN); Yijia Ding, Beijing (CN)

(73) Assignee: BEIJING AEROSPACE INSTITUTE FOR METROLOG AND MEASUREMENT TECHNOLOGY, Beijing (CN)

(*) Notice: Subject to any disclaimer, the term of this patent is extended or adjusted under 35 U.S.C. 154(b) by 68 days.

(21) Appl. No.: 18/518,043

(22) Filed: Nov. 22, 2023

(65) Prior Publication Data
US 2024/0095159 A1 Mar. 21, 2024

(30) Foreign Application Priority Data
Aug. 18, 2023 (CN) .......................... 202311041164.4

(51) Int. Cl.
*G06F 11/3668* (2025.01)
(52) U.S. Cl.
CPC ................................ *G06F 11/3688* (2013.01)

(58) Field of Classification Search
None
See application file for complete search history.

(56) References Cited

U.S. PATENT DOCUMENTS

| | | | | |
|---|---|---|---|---|
| 5,130,936 A | * | 7/1992 | Sheppard | G06F 11/2257 702/123 |
| 2018/0349256 A1 | * | 12/2018 | Fong | G06F 40/284 |
| 2024/0095159 A1 | * | 3/2024 | Miao | G06F 11/3676 |

FOREIGN PATENT DOCUMENTS

| | | | | |
|---|---|---|---|---|
| CN | 110135558 A | * | 8/2019 | ........... G06N 3/0445 |
| CN | 110347600 A | * | 10/2019 | ........... G06F 11/3676 |
| CN | 111783930 A | * | 10/2020 | ............... G06N 3/02 |

(Continued)

OTHER PUBLICATIONS

Le, "Effective White-Box Testing of Deep Neural Networks with Adaptive Neuron-Selection Strategy", 2020, ACM (Year: 2020).*

(Continued)

*Primary Examiner* — Hossain M Morshed

(57) ABSTRACT

A method for assessing test adequacy of deep neural networks based on element decomposition is provided. The network testing is divided into black box testing and white box testing, of which key elements are decomposed and defined. Network parameters including a weight matrix and a bias vector are extracted. Importance values of neurons in individual layers of the deep neural network are calculated and clustered, and an importance value hot map of neurons in each layer is generated based on clustering results. Mutation testing, and index calculation and evaluation are performed.

5 Claims, 3 Drawing Sheets

(56) References Cited

FOREIGN PATENT DOCUMENTS

CN          115080383 A      9/2022

OTHER PUBLICATIONS

Byun, "Black-Box Testing of Deep Neural Networks", 2021, IEEE (Year: 2021).*
Jihua Liu, "Adequacy Criteria and Evaluation Index of Software Testing", Journal of Shanxi Normal University Natural Science Edition, vol. 26, No. 4, Dec. 2012, pp. 21-25.
Yao Zhang et al., "Model-based Approach for Software Test Adequacy Analysis", Computer Science, vol. 40, No. 2, Feb. 2013, pp. 153-157.
Zan Wang et al., "Survey on Testing of Deep Neural Networks", Journal of Software, vol. 31, No. 5, May 2020, pp. 1255-1275.

* cited by examiner

METHOD FOR ASSESSING TEST ADEQUACY OF NEURAL NETWORK BASED ON ELEMENT DECOMPOSITION

CROSS-REFERENCE TO RELATED APPLICATIONS

This application claims the benefit of priority from Chinese Patent Application No. 202311041164.4, filed on Aug. 18, 2023. The content of the aforementioned application, including any intervening amendments thereto, is incorporated herein by reference in its entirety.

TECHNICAL FIELD

The present disclosure relates to computer software testing, and more particularly to a method for assessing test adequacy of deep neural networks based on element decomposition, which is mainly applied to the test of deep neural networks.

BACKGROUND

The concept of test adequacy was first put forward in software testing. Test adequacy criteria are a set of rules that can be used to determine whether adequate tests have been conducted, and can also be used to guide the selection of test data by explicitly stating how to select test data. The testing cost and the quality of software obtained are different with different adequacy criteria for testing. Comprehensive and systematic test approaches have been proposed in the traditional software testing process, accompanied by the emergence of numerous manual and automated testing tools.

Currently, most of the test adequacy criteria for neural networks are derived from traditional software testing, and methods such as neuron coverage, neural activation path coverage, and surprise adequacy have been generated for evaluation based on the model structure and learning characteristics of neural networks.

High quality and high reliability are the desired quality requirements for neural network applications, and testing is an important guarantee for these two requirements.

With the continuous development of intelligent technologies and the emergence of their evaluation methods, accurate evaluation of neural network test adequacy has become an urgent need. Although some methods have been developed for assessing test adequacy of neural networks, there are still many problems that need to be solved.

First, compared with traditional software testing, the neuronal structure parameters of the neural network model are learned through training data rather than manually set by the programmer. The state of the parameters changes as learning proceeds, and the learning results are uninterpretable and unpredictable. According to the analysis of the study, the existing structured test adequacy criteria have low correlation with the neural network decision logic, and the reliability of the characterization of the test adequacy is doubtful. Therefore, the interpretability of the test adequacy criteria needs to be strengthened.

Then, the concept of neural network test adequacy is vague, which is basically equivalent to the adversarial sample detection ability in black box testing, while the test adequacy criterion in white box test has little correlation with the error detection ability, which has inconsistent definitions.

SUMMARY

In order to reliably evaluate test adequacy, enhance the application quality of neural networks, and guide and promote the development of intelligent technology, the present disclosure provides a method for assessing test adequacy of a neural network based on element decomposition to solve the problems of unclear concept division and low correlation with neural network decision logic in the prior art.

Through the decomposition of the elements of black-box testing and white-box testing methods, the two kinds of methods are integrated. The present disclosure improves the test adequacy evaluation mechanism, combines the model visualization method, and obtains the assessment results of test adequacy with semantic features to strengthen the interpretability of the evaluation which realizes the effective evaluation of test adequacy.

The present disclosure provides a method for assessing test adequacy of a neural network based on element decomposition, comprising test element decomposition, test parameter extraction, importance value clustering, mutation test, index calculation, and index evaluation.

(S1) the test element decomposition refers to the decomposition of key elements according to the testing process of neural network.

From the two perspectives of whether the test targets the internal structure of the software system and the specific implementation of the algorithm, it can be divided into white box testing and black box testing.

Black box testing, also known as functional testing or data-driven testing, is the testing from the user's point of view. In testing, the program is viewed as a black box that cannot be opened, and the tester tests at the program interface without considering the program's internal structure and internal characteristics at all. The black box testing only checks that the program functionality works properly as specified in the requirements specification, that the program properly receives the input digit saws and produces the correct output information, and that the integrity of external information (such as databases or files) is maintained.

The black box testing comprises four parts: functional coverage testing, performance testing, intensity testing and application security testing.

(1) Functional coverage testing clarifies the criteria for software system to fulfill its functions according to the software system functions specified in the software requirements specification (SRS), and clarifies the functions to be tested in test implementation according to the functional test items specified in the test outline. By comparison, the coverage ratio of the functions in the test outline to the functions in the SRS is obtained, which is the test adequacy of the functionality. The testing can further locate the function not covered by the test. Functional coverage testing is the test adequacy at the maximum granularity and is a fundamental guarantee of the adequacy of the testing of software for neural networks, which is instructive.

(2) Performance testing is to check whether the test detects the performance specified in the software requirements specification (SRS). Comparing test items in test outline with performance indexes in the SRS to obtain a performance coverage ratio (i.e., performance test adequacy). Calculating the difference between the actual performance indexes in test and the performance indexes in the SRS to obtain a calculated result. Therefore, the performance indexes that do not meet the performance requirements can be further obtained according to whether the calculated result is positive or negative.

(3) Intensity testing is to check to what extent the system can operate in the event of an abnormal or even faulty operating environment. The potential faults and abnormal system operating environments mentioned in the software requirement specification are set as strength test operators. Setting up system failure index to test under different strength test operators or combinations of operators. Stopping when the output value of the natural network software reaches the system failure index and testing the strength test operators and combinations at the time of stopping, which indicates the adequacy of the intensity test.

(4) Application security testing is to check the system's ability to protect against illegal intrusion. The illegal intrusion includes: loss of some test inputs, addition of adversarial samples to the test set, addition of data unrelated to the function under test, alteration of data labels, etc. The more faulty situations are found, the more adequate the test will be.

The white box testing, also known as structural testing or logic-driven testing, is used to test whether the internal actions of products are working properly according to the SRS, whether each path in the program can work correctly as intended according to the structural testing procedures within the program, regardless of its overall function. When using white box testing, the tester must examine the internal structure of the program, start with the logic of the program, and then get the test data.

According to structure and testing process of neural networks, the testing elements of the white box testing comprise: test case, training data, model structure and program implementation.

(1) A test adequacy corresponding to the test case is a test case test adequacy, which represents an extent to which the test data covers real data of application requirements. The real data refers to a data collected in real application scenario. Through manifold learning, the data can be mapped to the low-dimensional space. According to partitioning evenly to the set partition parameters, a low-dimensional space coverage of the test data and the real data. By calculating the low-dimensional space ratio of the test data to the real data, the matching between test data set and real demand can be expressed.

(2) A test adequacy corresponding to the training data is a training data test adequacy, which represents an extent to which the test data covers the training data. By calculating the low-dimensional space ratio of the test data to the training data, the test adequacy of the test data to the training data can be expressed.

(3) A test adequacy corresponding to the model structure is a model structure test adequacy, which represents an extent to which the test data activates a neural network model structure. According to different neural network structure coverage criteria, such as neuronal activation coverage, decision path coverage, etc., the neuronal activation values in the tested neural network are calculated. The results indicate the test adequacy of the test data to the model structure.

(4) A test adequacy corresponding to the program implementation is a program implementation test adequacy, which is evaluated by statement coverage, decision coverage, condition coverage, decision/condition coverage, path coverage or a combination thereof.

(S2) Test parameter extraction, which means that extracting network parameters of each layer in deep neural network during testing; wherein the network parameters comprise weight matrix and bias vector, test parameters comprise maximum values and minimum values of neuron activation.

(S3) Importance clustering is divided into two steps. Firstly, inversely calculating importance values of neurons in each network layer under each test case based on weight parameters and activation values extracted from step (S2). Then, clustering the importance of each layer neurons by k-means method to obtain clustering results of each layer, wherein the first layer of neurons corresponds to the input data, the clustering should be compounded with pixel importance information and location information. Based on the clustering results, a corresponding heat map of the importance values of the neurons in each layer can be plotted to visualize the model.

(S4) The mutation test refers to the mutation of the original model according to the clustering results, including input data mutation and model weight mutation. Testing the model after mutation again, and using the test parameter extraction module again to obtain the test process parameters and results of the model after mutation. Using the importance value calculation in importance clustering, the neuron importance value heat map of the model after the mutation can be plotted.

(S5) The index calculation refers to a calculation based on the test adequacy calculation method for each element in the test element decomposition.

(S6) The index evaluation comprising error correction ability evaluation and test cost evaluation, evaluates the index calculated by (S5).

Compared to prior art, the beneficial effects of the present disclosure are as follows:

(1) According to the characteristics of neural network testing, an evaluation method for test adequacy of neural network integrating black box testing and white box testing is constructed to improve the test adequacy evaluation mechanism.

(2) The present disclosure combines neural network model visualization technology to make neural network decision logic more intuitive.

(3) The present disclosure provides a general evaluation process for the adequacy of current neural network tests, which is conducive to the development of artificial intelligence technology.

DESCRIPTION OF THE DRAWINGS

The embodiments of the present disclosure will be described in detail with reference to the accompanying drawings to make objects, technical features and advantages of this application more obvious. The same reference numerals generally refer to the same components in the embodiments of the present disclosure.

DETAILED DESCRIPTION OF EMBODIMENTS

The embodiments of the present disclosure will be described below in detail with reference to the accompanying drawings. Although one embodiment of the present disclosure is shown in the accompany drawings, it should be understood that the embodiments described below can be implemented in various forms and should not be understood as limiting the scope of this application. The embodiments are provided herein in order to describe the present disclosure more thorough and complete, and fully convey the scope of the present disclosure to those skilled in the art.

The present disclosure provides a method for assessing test adequacy of a neural network, which adopts the means of test element decomposition to analyzes and summarizes the elements of the structure, training, testing, and application of the neural network. The present disclosure integrates the characteristics of neural networks in traditional software test adequacy evaluation, and applies neural network visible-interpretable technology to realize multi-dimensional and multi-level interpretable evaluation of test adequacy of neural networks.

Figure 1:
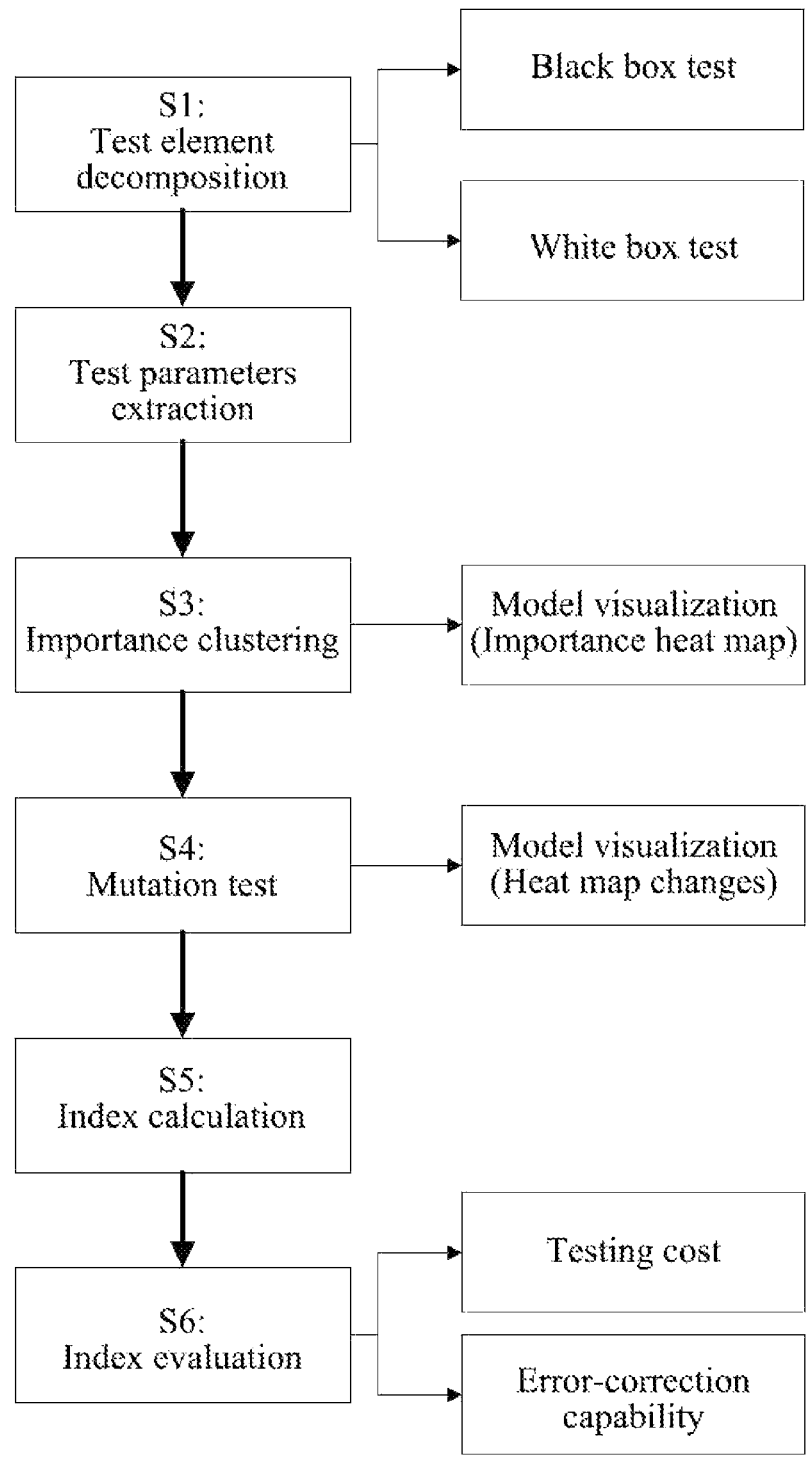
FIG. 1 is a flow chart of a method for assessing test adequacy of neural network in accordance with one embodiment of the present disclosure.
Figure 2:
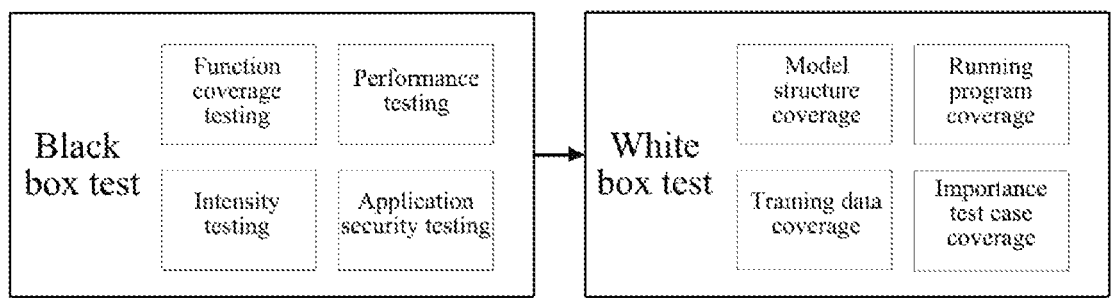
FIG. 2 schematically shows decomposition of test elements in accordance with one embodiment of the present disclosure.

A flow chart of a method for evaluating test adequacy of a neural network in accordance with one embodiment of the present disclosure is shown in FIG. 1.

Step 1, the test elements of neural network are decomposed. From the perspective of whether the test is aimed at the internal structure of the software system and the specific implementation algorithm, the neural network testing can be divided into white box testing and black box testing.

The black box testing is a test from user's point of view to check whether the program function is used normally in accordance with the SRS, whether the program can properly receive input data to produce correct output information, and maintain the integrity of external information. The black box testing includes four parts: functional coverage testing, performance testing, intensity testing, and application security testing.

(1) Functional coverage testing which based on the software system functions in the software requirements specification (SRS) is to clarify criteria for the completion of the function of the software system, and is a guarantee and instruction of the test adequacy of software testing. The functional requirements of software testing are usually as follows. (i) The design function is completed according to relevant documents. (ii) The correctness and reasonableness of the control process are verified. if the clearly specified software system functions can be achieved, the test is considered adequate.

(2) Performance testing is to check whether the system meets the performance specified in the SRS, and it is necessary to set performance indexes for the software to be tested in advance, such as the maximum time limit of transmission connection, transmission error rate, calculation accuracy, recording accuracy, response time limit and recovery time limit. If all performance indexes can be measured, the test is considered adequate.

(3) Intensity testing is to check the extent to which the system can run under the condition of abnormal operating environment or even failure. For example, (i) the input data rate is increased to an order of magnitude to determine how the input function will respond; and (ii) design test cases that require maximum storage or other resources for testing. The more fault situations are found, the more adequate the test will be.

(4) Application security testing is to check the ability of system to prevent illegal intrusion. For example, (i) making part of the test input missing, (ii) adding antagonistic samples to the test set, (iii) adding data unrelated to the function under test, and (iv) changing data labels, and so on. The more fault situations are found, the more adequate the test will be.

The white box testing, also known as structural testing or logic-driven testing, is used to test whether the internal actions of products are working properly according to the SRS, whether each path in the program can work correctly as intended according to the structural testing procedures within the program, regardless of its overall function. When using white box testing, the tester must examine the internal structure of the program, start with the logic of the program, and then get the test data.

According to structure and testing process of neural networks, testing elements can be decomposed into four parts: test case, training data, model structure and program implementation.

(1) Test adequacy of the training data of neural networks refers to the extent to which the test data covers the training data. Surprise adequacy is used to measure the diversity of new use cases are diverse relative to the use cases in the training set and can be used as an index of the adequacy of training data.

(2) A test adequacy corresponding to the test case is a test case test adequacy, which represents an extent to which the test data covers real application requirement data, and the coverage scope tends to be larger than the main functional space.

(3) A test adequacy corresponding to the model structure is a model structure test adequacy, which represents an extent to which the test data activates a neural network model structure, such as neuronal activation coverage, decision path coverage and so on.

(4) A test adequacy corresponding to the program implementation is a program implementation test adequacy, which is evaluated by statement coverage, decision coverage, condition coverage, decision/condition coverage, path coverage or a combination thereof.

Step 2 is a test parameter extraction, which means that extracting network parameters of each layer in deep neural network during testing. The network parameters include a weight matrix and a bias vector. And the test parameters include maximum values and minimum values of neuron activation.

When the neural network to be tested is a fully connected neural network, a network parameter $p_{i,j}$ of each layer is extracted, $p_{i,j}$ represents a parameter of a j-th layer under an i-th test case. The network parameters include a weight matrix $\omega_{i,j}$ and a bias vector $b_{i,j}$, and the dimensions of $\omega_{i,j}$ and $b_{i,j}$ are determined by the number of neurons. When the number of neurons in the j-th layer is m and the number of neurons in a (j−1)-th layer is n, such that $\omega_{i,j}$ is a m×n matrix, $b_{i,j}$ is a m×1 matrix, and $p_{i,j}$ is a m×(n+1) matrix and expressed as $p_{i,j}=[\omega_{i,j}, b_{i,j}]$.

The test procedure parameter $c_{i,j}$ is extracted during the test. $c_{i,j}$ represents a test procedure parameter of the j-th layer under the i-th test case, and includes maximum $u_{i,j}$, and minimum $d_{i,j}$ for activating neurons in the j-th layer. When the number of neurons in the j-th layer as m, such that $u_{i,j}$ and $d_{i,j}$ are both a m×1 matrix, and $c_{i,j}$ is a m×2 matrix, and expressed as $c_{i,j}=[u_{i,j}, d_{i,j}]$.

Figure 3:
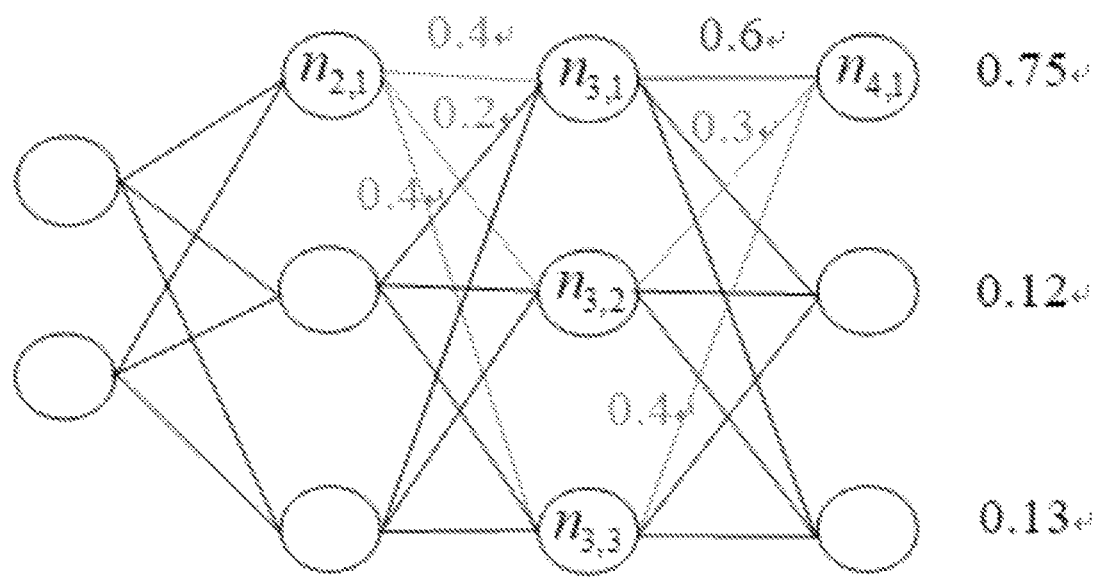
FIG. 3 schematically shows calculation of importance values in neural network to be tested in accordance with one embodiment of the present disclosure.

Step 3 is importance clustering. First, importance values of neurons in each network layer under each test case are inversely calculated based on weight parameters extracted by test parameters extraction. As shown in FIG. 3, $n_{j,k}$ is set as the k-th neuron in the j-th layer. $a_{i,j,k}$ is the active value of the $n_{j,k}$ under the i-th test case, $I_{i,j,k}$ is the importance of $a_{i,j,k}$. That is, $a_{t,4}=[0.75, 0.12, 0.13]$ is the active value of the last layer under the i-th test case i, which is the same as the importance value. When $a_{i,3}=[1, 0.8, 0.5]$ is the active value of the third layer, $a_{i,2,1}=0.5$ is the active value of $n_{2,1}$, and thus $$I_{i,3,k} = \sum_q I_{i,4,q} \times \omega_{i,4}(k, q) \times a_{i,3,q}$$

is the importance value of the neuron in the third layer, where $\omega_{i,4}(k,q)$ is the (k,q)-th element of the weight matrix $\omega_{i,4}$.

Then, the importance values of each layer neurons are clustered by k-means method to obtain clustering results of each layer. A first layer of neurons corresponds to the importance values of input data, the clustering should be compounded with pixel importance information and location information. Based on the clustering results, a corresponding heat map of the importance values of the neurons in each layer can be plotted to visualize the model.

Step 4 is the mutation test refers to the mutation of the original model, including input data mutation and model weight mutation. The input data mutation means randomly selecting clustered data blocks for mutation at the same degree. For example, for image inputs, the contrast is simultaneously turned up by a certain degree. Model weight mutation i.e., simultaneous mutation of a randomly selected class of neuron weights by multiplying them simultaneously by a factor (e.g., 1.1 or 0.9) in equal proportions. The model after mutation is tested again, and test parameter extraction was performed again to obtain the test process parameters and results of the model after mutation. The importance values in importance clustering are used to draw the importance statistical heat map of the model after the mutation.

The step 5 is the index calculation refers to a calculation based on the test adequacy calculation method for each element in the test element decomposition.

The step 6 is the index evaluation including error correction ability evaluation and test cost evaluation, evaluates the index of the index calculation.

The test cost is related to the selection of the test adequacy criterion, which can be measured by the size of the test set. The larger the test set to be used under this criterion, the higher the overhead is.

The fault-detecting ability is the most direct measure of the validity of the test adequacy criteria, which can be calculated by experimental statistics. For datasets injected with the same amount of confounding data, the more confounding data that can be identified, the better the test adequacy criterion is at uncovering errors.

Described above are only illustrative of the technical solutions of the present disclosure, and should not be construed as a limitation on the scope of the disclosure. For those skilled in the art, any improvements or variations made without departing from the scope and spirit of the present disclosure shall fall within the scope of the present disclosure defined by the appended claims.

What is claimed is:

1. A method for assessing test adequacy of a neural network based on element decomposition, comprising the following steps:
    (S1) dividing neural network testing into black box testing and white box testing; decomposing key elements of the black box testing and key elements of the white box testing; and defining a test adequacy of the key elements of the black box testing and a test adequacy of the key elements of the white box testing;
    (S2) extracting network parameters of each layer in the neural network during testing; wherein the network parameters comprise a weight matrix and a bias vector, and test procedure parameters comprise maximum values and minimum values of neuron activation;
    (S3) inversely calculating importance values of neurons in each layer of the neural network under each test case based on weight parameters and activation values extracted in step (S2); clustering the importance values of neurons in each layer; and generating a neuron importance value heat map of each layer based on clustering results;
    (S4) mutating a model of the neural network according to the clustering results to obtain a mutated model, testing the mutated model and performing test procedure parameter extraction, importance value calculation and clustering to obtain an importance value heat map of the mutated model;
    (S5) performing index calculation according to a test adequacy calculation method of the key elements of the black box testing and the key elements of the white box testing; and
    (S6) evaluating indexes calculated in step (S5);
    wherein the step (S2) comprises:
    extracting a network parameter $p_{i,j}$ of each layer of a to-be-tested fully-connected neural network, wherein $p_{i,j}$ represents a parameter of a j-th layer under an i-th test case, and the network parameter $p_{i,j}$ comprises a weight matrix $\omega_{i,j}$ and a bias vector $b_{i,j}$, wherein dimensions of $\omega_{i,j}$ and $b_{i,j}$ are determined by the number of neurons; setting the number of neurons in the j-th layer as m and the number of neurons in a (j−1)-th layer as n, such that $\omega_{i,j}$ is a m×n matrix, $b_{i,j}$ is a m×1 matrix, and $p_{i,j}$ is a m×(n+1) matrix and expressed as $p_{i,j}=[\omega_{i,j}, b_{i,j}]$; and
    extracting a test procedure parameter $c_{i,j}$ during the testing, wherein $c_{i,j}$ represents a test procedure parameter of the j-th layer under the i-th test case, and comprises maximum $u_{i,j}$ and minimum $d_{i,j}$ of activating neurons in the j-th layer;
    setting the number of neurons in the j-th layer as m, such that $u_{i,j}$ and $d_{i,j}$ are both a m×1 matrix, and $c_{i,j}$ is a m×2 matrix, and expressed as $c_{i,j}=[u_{i,j}, d_{i,j}]$.

2. The method of claim 1, wherein in step (S1), the key elements of the black box testing comprise functional coverage testing, performance testing, intensity testing, and application security testing;
    a test adequacy corresponding to the functional coverage testing is a functional coverage test adequacy, which represents an extent to which test data covers a functionality requirement of the neural network;
    a test adequacy corresponding to the performance testing is a performance test adequacy, which represents an extent to which the test data covers a performance requirement of the neural network;
    a test adequacy corresponding to the intensity testing is an intensity test adequacy, which represents an extent to which the test data covers abnormal operation and fault occurrence of the neural network;
    a test adequacy corresponding to the application security testing is a security test adequacy, which represents an extent to which the test data covers an illegal intrusion to the neural network; and the key elements of the white box testing comprise test case, training data, model structure, and program implementation;

a test adequacy corresponding to the test case is a test case test adequacy, which represents an extent to which the test data covers real application requirement data;

a test adequacy corresponding to the training data is a training data test adequacy, which represents an extent to which the test data covers the training data;

a test adequacy corresponding to the model structure is a model structure test adequacy, which represents an extent to which the test data activates a neural network model structure; and a test adequacy corresponding to the program implementation is a program implementation test adequacy, which is evaluated by statement coverage, decision coverage, condition coverage, modified condition/decision coverage (MC/DC), path coverage or a combination thereof.

3. The method of claim 1, wherein the step (S3) comprises:

letting $n_{j,k}$ be a k-th neuron in the j-th layer, $a_{i,j,k}$ be an activation value of the $n_{j,k}$ under the i-th test case and $I_{i,j,k}$ be an importance value of $n_{j,k}$ under the i-th test case; wherein $I_{i,j,k}$ is expressed as:

$$I_{i,j,k} = \sum_q I_{i,j+1,q} \times \omega_{i,j+1}(k, q) \times a_{i,j+1,q},$$

wherein $\omega_{i,j+1}(k,q)$ represents element (k,q) in a weight matrix $\omega_{i,j+1}$;

clustering the importance values of the neurons in each layer using k-means method to obtain clustering results of each layer, wherein a first layer corresponds to input data for the clustering; and plotting a corresponding heat map of the importance values of the neurons in each layer.

4. The method of claim 1, wherein in the step (S4), the mutation comprises input data mutation and model weight mutation;

wherein the input data mutation comprises:

randomly selecting a clustered data block for mutation of the same degree; and the model weight mutation comprises:

simultaneously multiplying weights of a randomly-selected class of neurons by a coefficient for equal-proportional mutation.

5. The method of claim 1, wherein in the step (S6), the evaluation of indexes calculated in step (S5) comprises error-correction capacity evaluation and testing cost evaluation;

wherein the testing cost evaluation comprises:

evaluating a testing cost according to a size of a test set;

wherein under a test adequacy criterion, testing cost is directly proportional to size of the test set; and the error-correction capacity evaluation comprises:

calculating error-correction capacity by experimental statistics; wherein for a data set having obfuscating data of same size, quantity of identified confusing data is directly proportional to strength of the error-correction capacity of the test adequacy criterion.

* * * * *